Feb. 26, 1929. 1,703,530
J. P. HUME
CHAIN GEARING
Filed Feb. 14, 1927
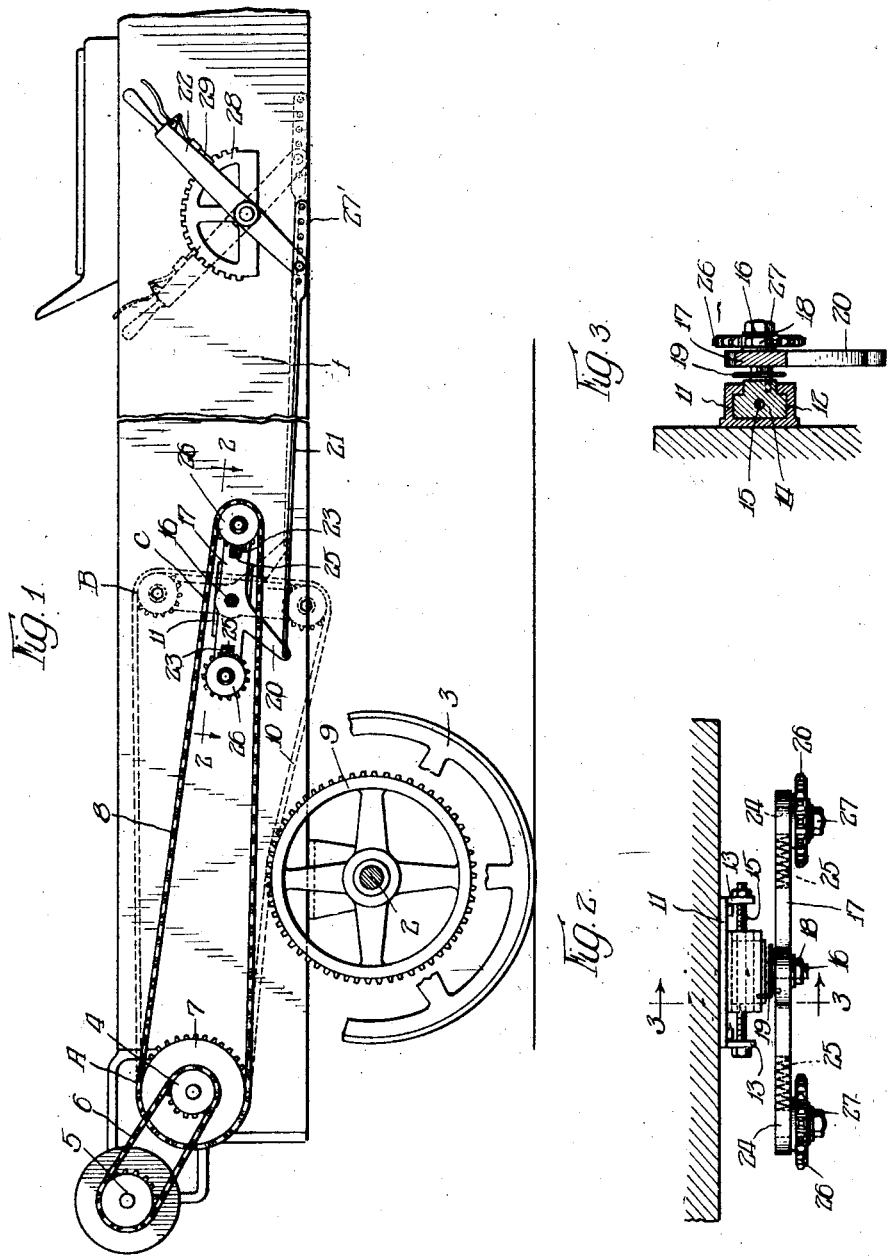
Witness:
R. Burkhardt
Inventor:
James P. Hume Patented Feb. 26, 1929.

1,703,530

UNITED STATES PATENT OFFICE.

JAMES P. HUME, OF CHICAGO, ILLINOIS.

CHAIN GEARING.

Application filed February 14, 1927. Serial No. 167,888.

My invention relates to improvements in drive mechanism, more particularly to the type of mechanism comprising a flexible gearing element such as for instance a chain and sprockets employed on farm vehicles, such as spreaders or the like, whereby means is afforded for driving mechanism carried by the vehicle from the axle of the vehicle together with means for connecting and disconnecting the driving and driven elements so as to effect a starting and stopping of the driven mechanism at the will of the operator.

One of the objects of my invention is to provide a drive mechanism of a type to be used on spreaders or the like which will serve as a driving connection between the axle of the vehicle and the mechanism to be driven but which can be disconnected at will.

Another object of my invention is to provide a drive of the type described in which an endless chain is positioned over a sprocket fixed to the axle of a vehicle, said chain being in permanent mesh with a sprocket on mechanism to be driven but which chain is adapted to be lifted above the level of the axle sprocket so as to effect a non-driving relation between the chain and axle sprocket or to be lowered so as to engage the axle sprocket tangentially in a manner to effect a driving connection between the driven mechanism and the driving axle, and to effect such operation by a single operating means which will maintain the circumferential distance occupied by the chain in all positions substantially constant.

Another object of my invention is to provide a chain drive of the above described type which an endless chain is positioned over a sprocket fixed on the axle and which has a loop at each end, one loop being in permanent engagement with mechanism to be driven and the other loop being positioned over a pivoted lever, said lever causing the chain to engage and disengage the axle sprocket upon movement and being of a type to maintain the chain taut in all positions of movement; that is, in "off" and "on" positions, and in all intermediate positions effected during the manipulation of the device.

Another object of my invention is to provide a chain drive of the above described type in which the runs of the chain are spread in opposite directions to cause an engagement with the driving sprocket and are caused to approach each other to effect a non-driving relation, and in this manner maintain the chain taut in all positions.

Another object of my invention is to provide a single operating means for a chain drive of the above described type which is of such a structure that the distance around the driven sprocket over to and around the operating means and back to the driven sprocket is always the same for all positions of the operating means.

To this end, a further object of my invention is to provide an operating lever positioned in the forward loop of a chain drive of the above described type, and which is pivoted so as to provide two arms, the arms being provided at their ends with idler sprockets which support the chain in a manner to permit the chain to pass thereover when in operating position, but which serve as guide sprockets to displace the runs of the sprocket when the lever is rotated, in a manner to cause the lower run of the sprocket chain to engage tangentially the driving sprocket to effect a driving connection.

Another object of my invention is to provide a chain drive of the type described which embodies all of the advantages set forth in the above stated objects, together with an adjustable bearing for said lever so as to permit movement of the lever bodily in order to take up any slack found in the chain due to wear.

These and other objects are accomplished by means of the arrangement disclosed on the accompanying sheet of drawings, in which—

Figure 1 represents a side elevation of a vehicle equipped with my improved drive mechanism, disclosing the relationship of the parts and the structure of the operating lever;

Figure 2 is an enlarged plan view of the operating lever as seen from the plane represented by the line 2—2 of Figure 1; and, Figure 3 is a cross-sectional side elevation of the operating lever and adjustable bearing therefor as taken on the line 3—3 of Figure 2.

The various novel features of the invention will be apparent from the following description and drawings, and will be particularly pointed out in the appended claims.

Referring to the drawing, it will be noted that my invention is adapted for use on a vehicle, such as 1, mounted on an axle 2 rotated by the ground wheel 3 when the vehicle travels over the ground. Mounted on the rear of the vehicle are two rotary elements, designated 4 and 5, which constitute the driven mechanism such as spreading apparatus or any other mechanism to be driven from the rotating axle of the vehicle, connected together by a chain 6, the element 4 being provided with a sprocket 7 adapted to receive and be driven by the endless sprocket chain 8 positioned longitudinally of the vehicle body on one side thereof. A sprocket 9 is fixed on the axle 2 and positioned in the same vertical plane as the chain 8 so that the chain will directly overlie the sprocket in a manner to engage same when the lower run 10 is displaced downwardly.

Mounted on one side of the vehicle body forwardly of the rear axle is the bracket 11 provided with a slide groove 12 and ears 13, the bearing block 14 being positioned in the slide, as shown in Figure 3, and threaded on the bolt 15 positioned through the ears so that when the bolt is turned, the block is moved relative to the bracket. Projecting from the block is a spindle 16 on which the lever 17 is pivotally mounted intermediate its length, being held thereon by any suitable means such as the nut 18. Positioned between the block and the lever is the torsional coil spring 19 having one end fixed relative to the block and its other end fixed relative to the lever, the spring being so wound that it is tightened when the lever rotates counterclockwise, or, in other words, so that it exerts a force tending to hold the lever in the "off" position, as shown in full lines in Figure 1.

Extending from one side of the lever a projection 20 is provided, perforated at its outer end and positioned at an angle to the perpendicular, the outer end receiving one end of the operating rod 21 so as to be rotated by the movement of the hand lever, designated generally 22, connected to the opposite end of the rod, and to thereby rotate the lever. The outer ends of the two arms of the lever are provided with slots 23 in which blocks 24 of any suitable structure are mounted, held outwardly by the springs 25. The blocks 24 are provided with bearing spindles extending laterally therefrom, having mounted thereon idle sprockets 26 held in mounted relation by the nuts 27. It is to be noted that the sprockets 7, 19 and 26 are all positioned in the same plane so that the sprockets 26 will properly engage and support the forward loop of the chain. It is preferable but not necessary to so proportion the lever size and the size of the sprocket 7 relative to each other that the space represented between points A, B and C, as shown in Figure 1 of the drawing, will be an isosceles triangle in which case the chain length for both "on" and "off" positions is exactly the same, any slight variance which might occur during intermediate positions of movement being compensated for by the action of the springs 25 if this is found necessary, it being understood that I do not, however, intend to limit myself to the use of the springs 25, the chain being maintained taut otherwise. The forward end of the operating rod 21 is provided with an adjustable connection 27' in order to permit the lever bearing to be moved bodily without displacing the operating lever 22. The operating lever 22 is of any well known type, the form shown being provided with arcuate rack 28 and locking pawl 29 suitable for manipulation when the handle of the lever is engaged.

In operation, the device is normally in "off" position, as shown in full lines in Figure 1, and the operator permits the drive to so remain until he desires the spreading apparatus to operate. The vehicle being in motion, at this time the lever 22 is pulled back to the dotted line position, causing the lever 17 to rotate through an arc of 90° to the dotted line position shown in Figure 1, causing the lower run 10 of the chain to be displaced downwardly to mesh with the sprocket 9 and thus to be driven thereby. To disengage the driving connection, a reverse operation is all that is necessary, the apparatus again assuming the full line position, the lower run of the chain being held above the level of the driving sprocket. It can be readily seen that the arrangement affords a means whereby the chain is caused to engage and disengage at the will of the operator and that the chain is maintained in a taut condition in all positions by the proportions selected for the parts. If it is found that the intermediate positions of the lever cause the chain to slacken, the springs 25 will act to take up the slack, it being understood that when the sprockets 26 are in engagement with the chain, the blocks 24 are in toward the hub causing a compression of springs 25 and allowing ample expanding space. Any adjustment necessary to compensate for wear in the chain is accomplished by turning the bolt 15 in a manner to move the lever bearing forward thereby compensating for any slack found therein.

It is to be understood in connection with this invention that the primary object is to provide a device which will act to shift the belt or chain "on" and "off" to connect and disconnect the drive but which will at all times maintain the chain taut. This last feature is effected by the structure of the operating lever, that is one arm gives away to slacken the chain simultaneously with and at the same rate as the other arm acts to take up the slack. If it is desired, it is within the scope of my invention to provide the two arms of the lever as separate parts adjustably connected to the hub in a manner to permit either one or both to be extended or shortened as desired. With such a provision it can be seen that the device may be so adjusted as to cause either the slackening action or the tightening action to be in excess of the other which will permit the movement of the lever to have a total tightening or slackening effect according to conditions on a particular installation. This last feature is useful in cases where it is found desirable to so proportion the size of the parts that this is necessary to cause the lever acting alone to take care of same length of chain for all positions assumed in the actuating operation, the adjustment making it possible to have one arm shorter than the other or both the same length but variable to suit any particular installation.

I claim:

1. In a chain drive, an endless chain and an operating lever positioned in operative relationship with a loop of said chain, said lever having two arms, one arm traveling upon movement of said lever away from said loop at a definite rate and in a manner to displace one run of said chain, and the other arm traveling upon movement of said lever toward said loop and in a manner to displace the opposite run of said chain whereby the chain is maintained taut in all positions.

2. In a chain drive, a driving sprocket and an endless chain adapted to move into and out of engagement with said sprocket, and operating means positioned in operative relation with said chain acting upon movement to displace the runs of said chain in opposite directions to engage one of said runs with said sprocket, said operating means maintaining said chain taut in all positions.

3. In a chain drive, an endless chain, gearing elements associated with said chain and a pivoted actuator positioned in one loop thereof, for connecting and disconnecting said chain with one of said gearing elements while maintaining the same taut in all positions, said actuator being mounted on a bodily movable bearing.

4. In a chain drive, an endless chain, a gearing element associated with said chain and an operating means positioned in one loop thereof adapted to displace one run of said chain to effect a driving connection with said gearing element, said operating means having a yieldingly mounted sprocket thereon.

5. In a chain drive, an endless chain and an operating lever therefor positioned in one loop of said chain, a driven sprocket in the other loop of said chain, and a driving sprocket positioned so as to be engaged by one run of said chain, said lever having arms on opposite sides of its pivot of such length proportional to said driven sprocket that the circumference around said driven sprocket and said lever is substantially constant for all positions of said lever.

6. In a chain drive, the combination of an endless chain, driving and driven gearing members associated with said chain and a single rotatable means capable of bodily linear motion for connecting and disconnecting said chain with one of said gearing members and for taking up slack in said chain.

7. A chain drive, an endless chain, gearing elements associated with said chain, one of said gearing elements being mounted in one loop thereof, and an actuating means located in a second loop thereof, for effecting a connection between said chain and the other of said gearing elements, said actuating means causing said second loop to enlarge and to simultaneously approach said first loop at such a rate relative to the enlarging action that the circumferential distance around the parts occupied by said chain is constant for all positions of said actuating means.

8. In a chain drive, the combination of an endless chain, gearing members associated with said chain, and means for connecting and disconnecting said chain with one of said gearing elements, said means having a pair of chain engaging portions movable in arcuate paths from a position where both lie substantially on the center line of said chain to positions outside of said center line, and vice versa.

9. In a chain drive, the combination of an endless chain, gearing members associated with said chain, and means for connecting and disconnecting said chain with one of said gearing elements, said means having a pair of chain engaging portions movable in arcuate paths from a position where both lie substantially on the center line of said chain to positions outside of said center line, on opposite sides thereof and vice versa.

10. In a chain drive, an endless chain and an operating lever positioned in operative relationship with a loop of said chain, said lever having two arms, one arm traveling upon movement of said lever away from said loop at a definite rate and in a manner to displace one run of said chain and the other arm traveling upon movement of said lever toward said loop at a rate having a predetermined relationship to said definite rate and in a manner to displace the opposite run of said chain, whereby the chain is maintained taut in all positions.

11. In a chain drive, an endless chain and an operating lever positioned in operative relationship with a loop of said chain, said lever having two arms, one arm traveling upon movement of said lever away from said loop in a manner to displace one run of said chain, and the other arm traveling upon movement of said lever toward said loop in a manner to displace the opposite run of said lever, the combining effect of said arms maintaining the chain taut in all positions it is caused to assume in operation.

12. In a drive mechanism, the combination of a driving element and a driven element, a flexible gearing member in driving relationship with one of said elements, and means for moving said flexible gearing member into and out of gear with the other of said elements, said means comprising an actuator in association with said flexible gearing element and adapted upon movement to displace the runs of said flexible gearing element in such manner that the flexible gearing element is maintained taut by said actuator in all positions said flexible gearing element is caused to assume in operation.

Signed at Chicago, Illinois, this 10 day of February, 1927.

JAMES P. HUME.